United States Patent [19]

Parker, Jr.

[11] 3,796,192
[45] Mar. 12, 1974

[54] METHOD AND APPARATUS FOR HANDLING LIVE POULTRY

[76] Inventor: Alonzo E. Parker, Jr., 1031 S. Plum St., Durham, N.C. 27701

[22] Filed: Oct. 14, 1971

[21] Appl. No.: 189,295

[52] U.S. Cl. .............................. 119/97 R, 119/17
[51] Int. Cl. ............................................ A01k 37/00
[58] Field of Search............ 119/97 R, 45, 15, 15.5, 119/17, 19, 148; 17/44.1

[56] References Cited
UNITED STATES PATENTS

| | | | |
|---|---|---|---|
| 1,222,072 | 4/1917 | Collins | 17/44.1 |
| 3,260,239 | 7/1966 | Sanders | 119/97 R |
| 3,292,581 | 12/1966 | Van Nest | 119/17 |
| 3,234,915 | 2/1966 | Sanders | 119/97 R |

Primary Examiner—Louis G. Mancene
Assistant Examiner—J. N. Eskovitz

[57] ABSTRACT

A method and apparatus for handling live poultry are based on using a coop-like structure which incorporates processing plant type conveyor shackles as part of the coop structure. The shackles are loaded at the farm with the poultry, are transported with the loaded poultry as part of a coop structure between the poultry farm and the poultry processing plant and at the plant are then removed from the coop structure and placed directly on the poultry processing conveyor.

10 Claims, 16 Drawing Figures

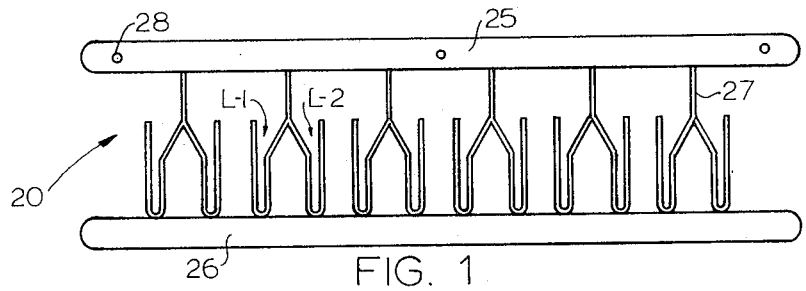
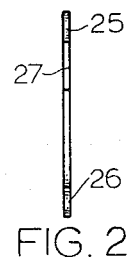
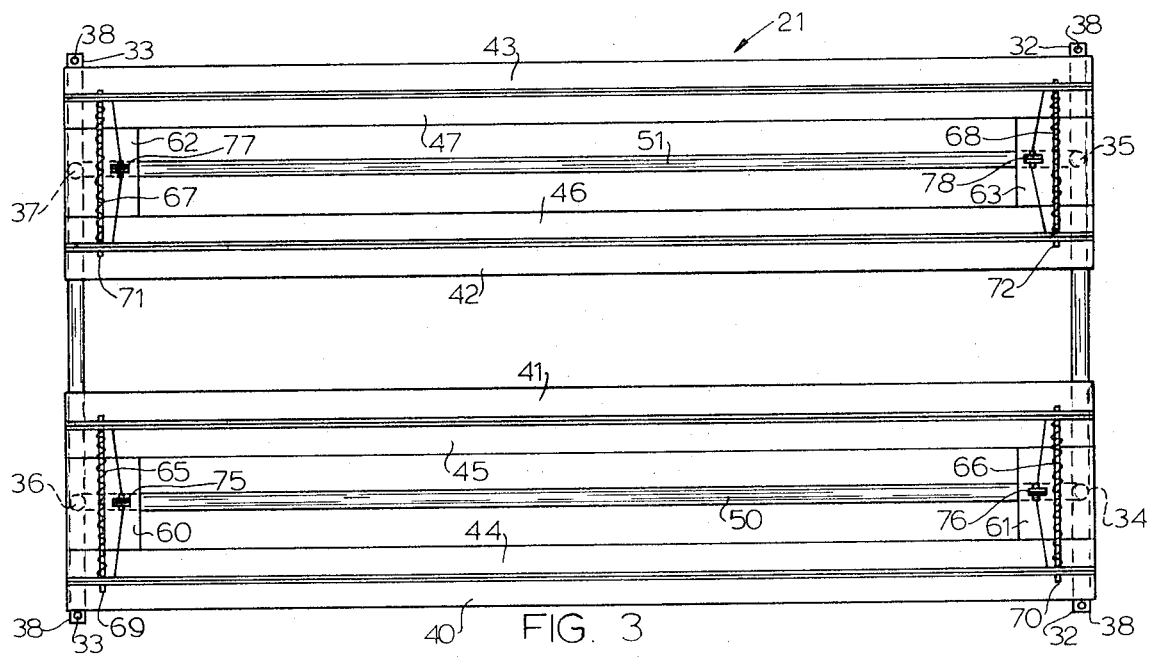
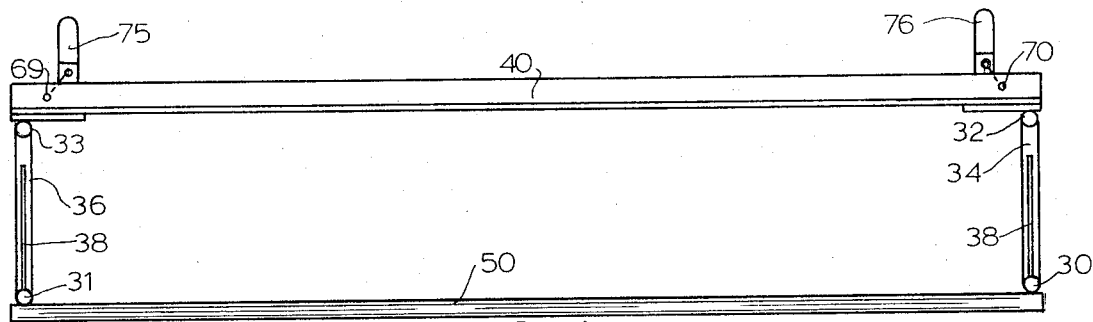
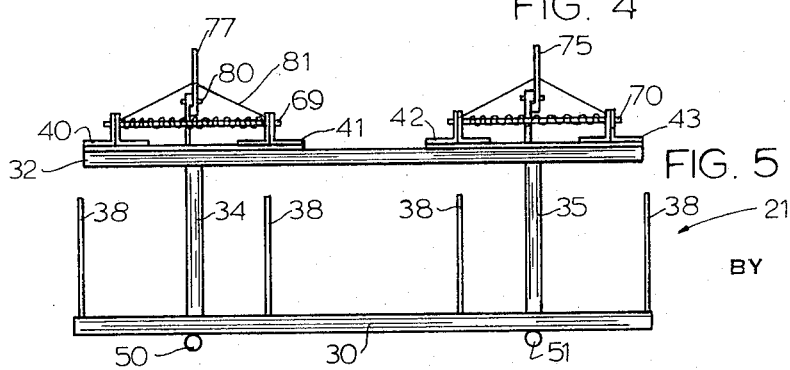
INVENTOR
Alonzo E. Parker, Jr.
ATTORNEY

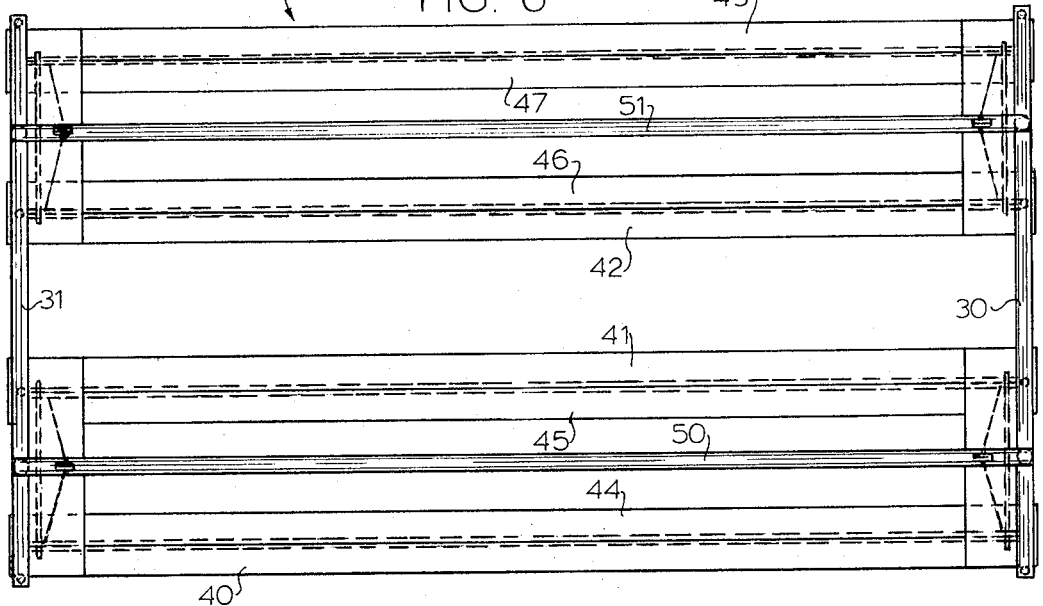
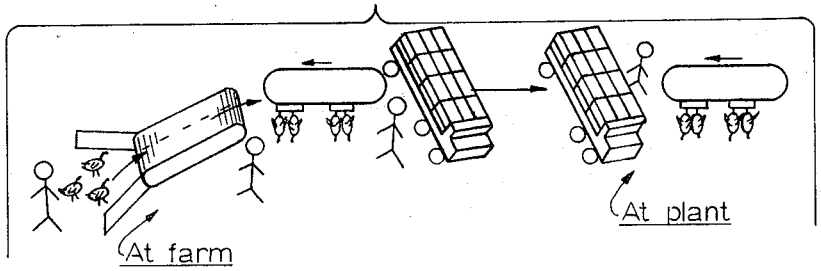
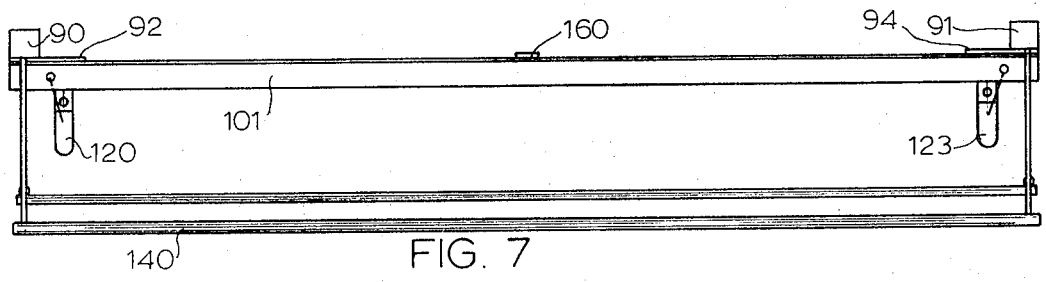
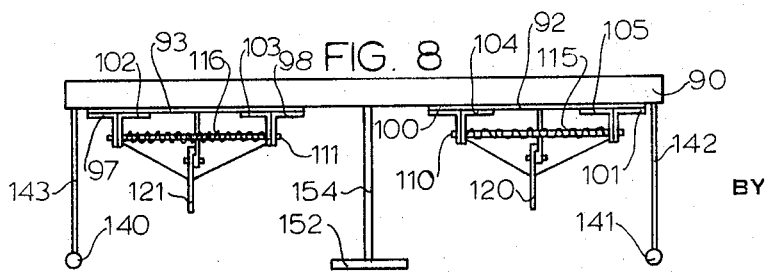

INVENTOR
Alonzo E. Parker, Jr.
BY
B. B. Olive
ATTORNEY

METHOD AND APPARATUS FOR HANDLING LIVE POULTRY

BACKGROUND OF THE INVENTION

1. Field of the Invention

The invention relates to coops and similar structures for transporting live poultry and to methods of handling live poultry at the poultry farm, in transit between the poultry farm and the poultry processing plant and at the poultry processing plant.

2. Description of the Prior Art

The common way of transporting poultry between the farm and the processing plant involves catching the poultry, loading the poultry in a coop, transporting the coops on a truck to the processing plant, removing the coops at the poultry processing plant, temporarily storing the coops and, finally, removing the poultry from the coops and placing them on the first poultry processing conveyor. Since the live poultry is loose in the coop during transport from the farm, substantial damage to the poultry and substantial high death losses are incurred in transit. Furthermore, substantial handling of the poultry is required and the poultry is apt to escape at the poultry processing plant in the course of removing the poultry from the coop and placing it on the processing conveyor.

Within the poultry industry there has been substantially no attempt to secure the poultry in any way within the coop while being transported from farm to plant. U.S. Pat. No. 401,812, (1899) teaches the concept of securing individual chickens in a coop during transit. With this exception, there is no known coop device which restrains the chickens within the coop during transit. More specifically, there is no known coop apparatus which incorporates processing plant type conveyor shackles as part of the coop structure. Furthermore, there is no known system for handling poultry based on shackling the poultry at the farm, transporting the poultry in the shackles to the processing plant and suspending the poultry in the shackles at the plant.

SUMMARY OF THE INVENTION

The method and apparatus of the invention are based on the concept of loading the poultry at the farm into a shackle arrangement which, during transit from the farm to the plant, can become part of the transport coop structure and at the plant can be unloaded from the coop structure and placed directly on the poultry processing conveyor. Thus, the poultry is loaded on the same conveyor shackles at the farm from which they will be suspended at the poultry processing plant. By restraining the poultry in transit there is a substantial reduction in loss from suffocation, bruising and the like. Furthermore, there is a substantial reduction in the amount of labor required in the overall operation of removing the poultry from the farm to the processing plant.

DESCRIPTION OF THE DRAWINGS

FIG. 1 is a side view of a shackle structure adapted to the invention.

FIG. 2 is an end view of the shackle structure.

FIG. 3 is a top view of a base frame adapted to releasably receive one end of a plurality of the shackle structures.

FIG. 4 is a side view of the base frame.

FIG. 5 is an end view of the base frame.

FIG. 6 is a bottom view of the base frame.

FIG. 7 is a side view of a securing frame adapted to releasably receive an opposite end of a plurality of the shackle structures.

FIG. 8 is an end view of the securing frame.

FIG. 15 is a schematic illustration of an overall farm-to-plant system.

DESCRIPTION OF THE PREFERRED EMBODIMENT

The invention, as previously stated, is built around the concept of placing the poultry in a shackle structure at the farm, transporting this poultry loaded shackle structure to the processing plant and then placing the loaded shackle structure on the first processing plant conveyor line to commence the conventional processing steps. With this basic concept in mind it can be immediately seen that while a specific embodiment is described, the invention apparatus and method may partake of many specific forms.

Figure 12:
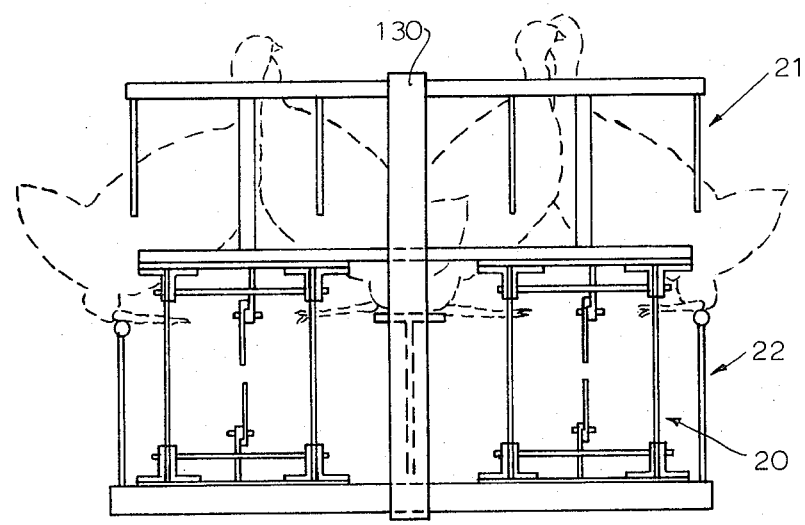
FIG. 12 shows the coop structure of FIG. 11 inverted and, in dashed lines, the fowl in an upright position of transport.
Figure 13:
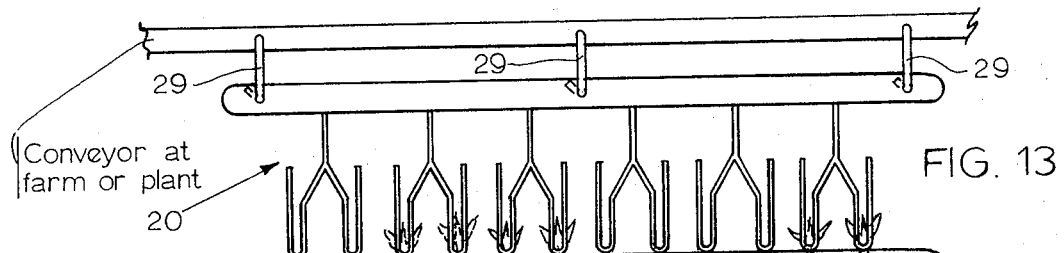
FIG. 13 illustrates fowl suspended on the shackle structure and the shackle structure in turn suspended on a farm or plant conveyor.
Figure 14:
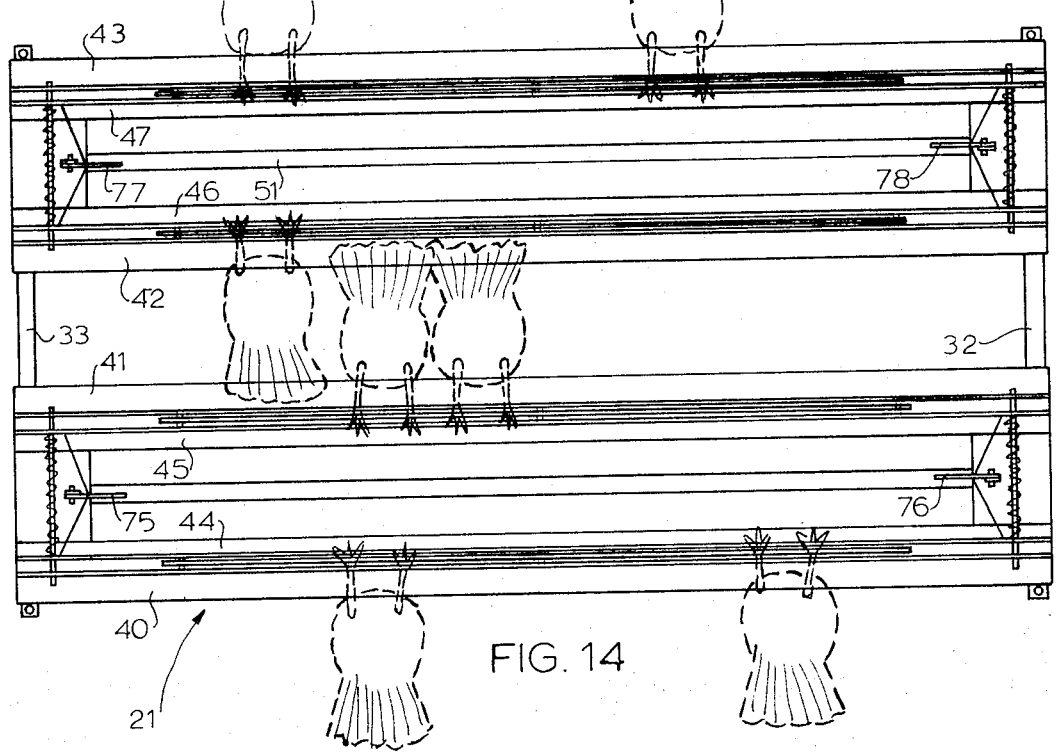
FIG. 14 is a top view of the base frame with a plurality of loaded shackle structures.

In the embodiment of coop apparatus shown in FIGS. 1-14, there are three components, namely a shackle string 20 best shown in FIGS. 1 and 13, a base loading frame 21, best shown in FIGS. 3-6 and 14, and a securing frame 22, best shown in FIGS. 7-10. The shackle string 20 in the embodiment shown is composed of two slightly flexible metal bands 25, 26 between which are secured a plurality of shackles 27 by spot welding or the like. Each shackle is adapted in the slots L-1, L-2 to releasably secure the legs of a fowl both in transit and at the processing plant. Band 25 is provided with appropriate holes 28 which are adapted to mate with suitable hooks or the like indicated at 29 (FIG. 13) on a farm loading conveyor and on the processing plant conveyor. Thus, when the poultry reaches the plant a particular loaded shackle string, shown partially loaded in FIG. 13, can be taken from the coop and placed directly on the plant conveyor. As the conveyor curves, the flexibility of the bands 25, 26 allows the shackle string 20 to assume a similar curvature.

The use of the mentioned components will be explained as well as their construction and from this it is believed that a quick appreciation of the invention will be gained. At the farm the live poultry may be collected together at a point near a loading station to which is brought the poultry truck, trailer or other means of transportation which will transport the poultry to the processing plant. At the farm the poultry, for example, may be funnelled onto a portable belt conveyor and directed towards another chain conveyor which moves between the truck and the discharge end of a belt conveyor. This is schematically illustrated in FIG. 15. Workers at one station near the truck may install successive ones of the shackle strings 20 on a chain conveyor, at another station near the discharge end of the belt conveyor may gather up the poultry and hang individual poultry on shackle strings 20 as they arrive on the chain conveyor, as illustrated in FIG. 13. Then the loaded shackle strings may be moved to the truck to be placed between the base frame 21 and securing frame 22 which are adapted, in the example shown, to releasably receive four of the loaded shackle strings 20 and to be secured together to form a coop-like structure. In practice, it has been found desirable after loading the fowl on the shackle string 20 to first releasably secure one end of the shackles to the base frame 21 with the fowl suspended, then to position the securing frame 22 on the base frame 21 and in the course of this last operation to releasably secure the other end of the shackles to the securing frame 22, then to releasably secure the base frame 21 and securing frame 22 together and then, finally, to invert the combined loaded base frame-shackle strings-securing frame structure to bring the fowl to an upright resting position preparatory to be transported to the plant. These operations will become more apparent as the description proceeds.

To describe base frame 21 in more detail reference will be made particularly to FIGS. 1-6. This frame is basically of tube and angle piece construction and includes a pair of lateral stringers 30, 31 mounted on a pair of longitudinal stringers 50, 51 and further secured to vertical post members 34, 35, 36, 37 which in turn support lateral stringers 32, 33. Each of the respective lateral stringers mount four vertical pins 38 which assist in confining those fowl loaded immediate the ends of base frame 21.

Mounted above the lateral stringers 32, 33 are respective plate members 60, 61, 62 and 63 and on these plate members are mounted a series of fixed longitudinal angle pieces 40, 41, 42 and 43 and movable longitudinal angle pieces 44, 45, 46 and 47. The movable angle pieces are compressed outwardly by compression springs 65, 66, 67 and 68 mounted on pins 69, 70, 71 and 72 and are moved inwardly by moving respective camming handles 75, 76, 77 and 78 which are mounted to rotate around respective pins such as that indicated at 80 in FIG. 5 and to tighten and loosen a wire such as that indicated at 81 in FIG. 5. That is, the purpose of these handle and wire arrangements is to provide a means for spreading the respective paired, fixed and movable angle pieces apart in order to releasably receive one end of the respective loaded shackle strings 20. This can be seen by assuming that the shackle string 20 in FIG. 13 is fully loaded and is ready to be removed from a chain conveyor on which it was loaded at the poultry farm. The operator takes this fully loaded shackle string and installs the lower band 26 and lower portions of the shackles between a selected pair of movable and fixed angle pieces. For example, by properly rotating handles 75, 76 angle pieces 40, 44 (FIG. 3) are spread apart and the loaded shackle string 20 will appear as in FIG. 14. This figure is intended to show how four such loaded shackle strings 20 will appear when loaded in the base frame 21, only a few fowl actually being shown to simplify the drawing. Note here that the fowl when loaded in base frame 21 at the poultry farm are initially in a suspended rather than in an upright position. Also note in FIG. 14 that the four camming handles are in a position which spreads the respective paired angle pieces apart. When the camming handles are rotated back to the approximate positions shown in FIG. 3, the respective paired pieces are brought back together under the influence of the respective compression springs and the respective shackle strings 20 become clamped.

Figure 9:
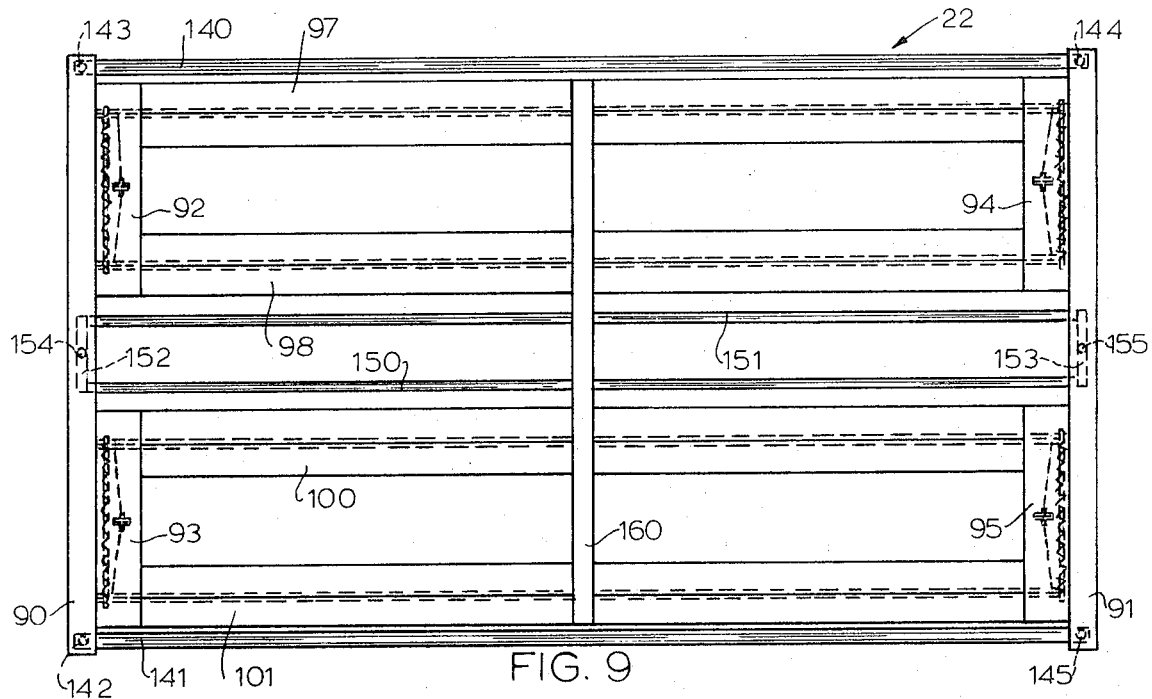
FIG. 9 is a bottom view of the securing frame.
Figure 10:
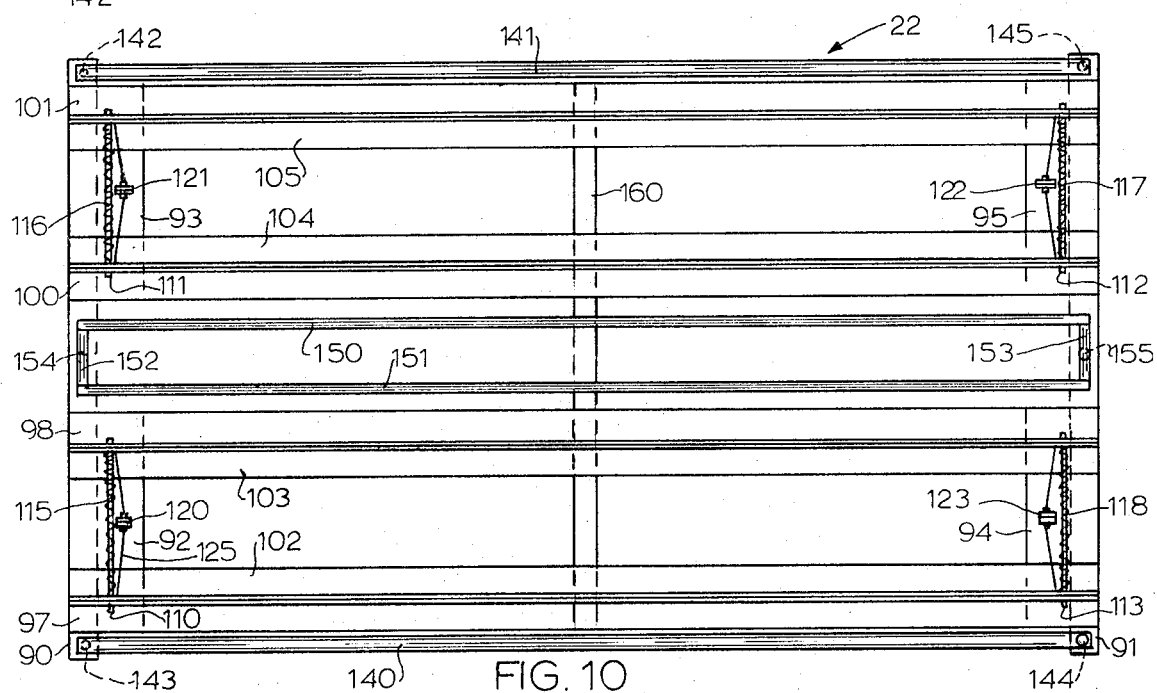
FIG. 10 is a top view of the securing frame.
Figure 11:
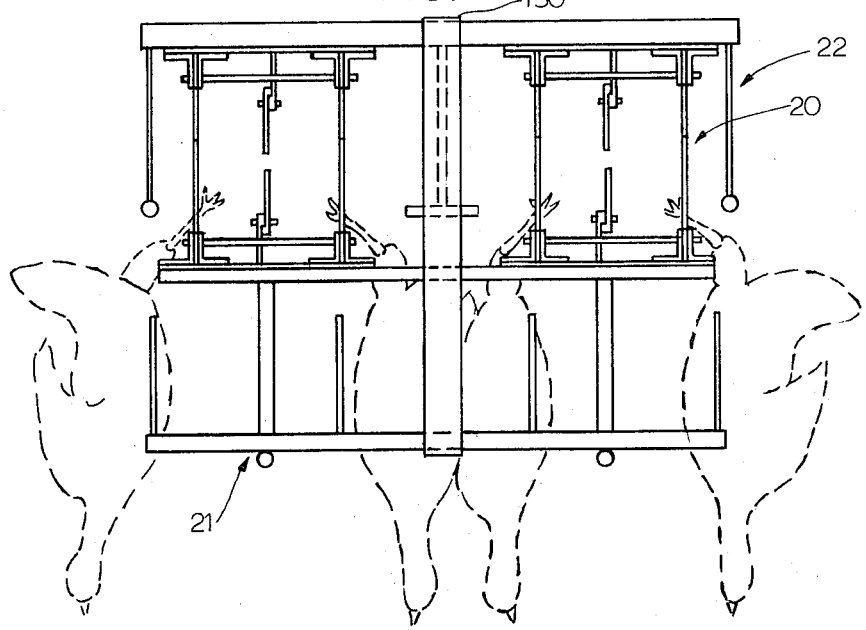
FIG. 11 is an end view of a securing frame releasably secured to a base frame and showing in dashed lines the relative poultry positions.
Figure 16:
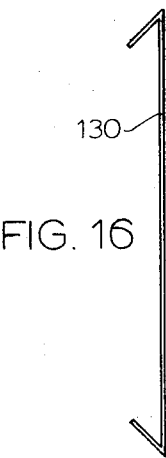
FIG. 16 is a side view of a banding clip used to assemble the base and securing frames.

The construction of the securing frame 22 is best shown in FIGS. 7-10. The purpose of the securing frame may again be stated as being that of releasably securing the ends of the loaded shackle strings 20 opposite the ends secured in the base frame 21. Also, when the securing frame 22 is releasably secured to the base frame it forms a kind of coop structure which is then inverted from the position shown in FIG. 11 to the position shown in FIG. 12 which brings the fowl into an upright position for transport to the processing plant. The securing frame 22, in the embodiment disclosed, is basically a tube and angle piece arrangement similar to the construction employed in the base frame 21. A pair of square-shaped tube members 90, 91 extend laterally and are affixed to one side of four plate members 92, 93, 94 and 95. Secured to an opposite side of the plate members are four fixed, longitudinal, angle pieces 97, 98, 100 and 101 opposite of which are four movable, longitudinal, angle pieces 102, 103, 104 and 105. The angle pieces are arranged in pairs and the movable angle pieces slide on the respective pins 110, 111, 112 and 113 under the compression of springs 115, 116, 117 and 118 which tend to force respective pairs together. The movable angle pieces are moved apart by the respective camming handles 120, 121, 122 and 123 which tighten and loosen respective wires such as that shown at 125 in FIG. 10. In this regard it has already been mentioned that similar pairs of angle pieces are moved on the base frame 21 to grasp one end of a loaded shackle string, as in FIG. 14, and in a similar manner the respective pairs of angle pieces on the securing frame 22 are moved to grasp a respective opposite end of the same loaded shackle string until four such loaded shackle strings are secured at both ends by four sets of angle pieces in both the base frame 21 and securing frame 22. FIG. 11 shows how the securing frame 22 appears when first mounted on the base frame 21 at the poultry farm with four shackle strings 20 loaded with fowl and releasably secured between respective pairs of angle pieces. The base frame and securing frame are themselves releasably secured together by a pair of resilient banding clips 130 (one only being shown in FIGS. 11 and 16).

After the base and securing frames are loaded and secured together in the manner just described, bearing in mind that these operations are performed at the farm, the poultry is left suspended as in FIG. 11. In the next operation the secured frames are inverted to the position shown in FIG. 12 and it is this position in which the fowl are transported to the processing plant. In order to provide the fowl with means for maintaining a suitable upright position in transit, the securing frame 22 is provided with a plurality of leg supports. In particular, a pair of outer, longitudinally extending support bars 140, 141 are supported by respective vertical posts 142, 143, 144 and 145. In the middle portion of the securing frame 22 there is a further leg support structure provided by a pair of longitudinal bars 150, 151 secured to cross pieces 152, 153 and supported in turn from posts 154, 155. A flat bar 160 adds strength to the overall coop-like structure.

As best seen in FIG. 12, the fowl are brought to an upright position for transit and are assisted by the mentioned leg support bar structure. Further, the fowl immediately adjacent the ends of the frames are restrained by the previously mentioned pins 38 secured to the base frame 21. Upon arrival at the processing plant the coops are again inverted, respective banding clips 130 are removed, the securing frame 22 is released and removed from the loaded strings 20 and then as the shackle strings are individually released from the base frame 21 they are directly hung on the plant processing conveyor as depicted in FIG. 13 thus eliminating all handling operations of the fowl between the arriving fowl transport truck and the plant conveyor.

With a broad method concept it can be seen that the invention is directed to collecting and loading the fowl at the farm on a shackle structure which is adapted to both transport the fowl and to be used on the processing plant conveyor, transporting the fowl to the plant while confined in the structure, unloading the fowl at the plant while retained in the same shackle structure and then installing the shackle structure on the processing plant conveyor. Looked at from a broad apparatus concept it can also be seen that the invention provides a shackle structure which is adapted to both receive and shackle the fowl at the farm, form part of a fowl transport structure in transit between farm and processing plant and at the plant is adapted to be received by the processing conveyor. Thus, the invention in both method and apparatus terms discloses a basically new method and apparatus for handling live poultry in mass quantities. While a specific embodiment has been disclosed the invention visualizes the possibility of a non-inverting type coop structure in which the fowl are initially loaded at the farm and are transported in an upright position. Also, within the broad concept of the invention is the concept of utilizing coop structures which extend for substantially the length of the poultry truck bed and of utilizing hydraulic lifts and the like to handle large loads of loaded shackle strings both at the farm and at the plant. Thus, what has been disclosed points the way to a great variation in form of method and apparatus.

In particular reference to support bars 140, 141, and 150, 151 it should also be noted that these bars in addition to acting to support the legs of the fowl also act, in effect, to hold in the respective shackles by appropriate distribution of the weight of the bird. Other means of supporting the fowl upright may of course be provided.

I claim:

1. The method of handling live poultry between the farm and processing plant and in processing comprising the steps of releasably securing each fowl to a shackle structure, transporting the fowl to the plant while so secured to such structure, at the plant installing the same said structure having the fowl on a plant conveyor for said processing plant and processing the fowl while said conveyor moves the said fowl in processing.

2. The method of claim 1 including the step of releasably assembling said shackle structure in a coop structure while in transit between said farm and plant.

3. The method of claim 2 including the step following said assembling of positioning said coop structure and shackle structure while in transit whereby said fowl are enabled to rest in an upright position.

4. The method of claim 3 including the steps of initially loading said shackle structure with said fowl hanging head down, then releasably securing said shackle structure to said coop structure, then inverting said coop and shackle structures whereby said fowl while in transit are enabled to rest in an upright position.

5. In a fowl handling system, in combination:
a. a shackle structure having a plurality of uniform shackles with means on each shackle for releasably securing selected limb portions of a plurality of live fowl, means for holding the shackles together as an integral uniform plural fowl securing and fowl supporting assembly capable of service in both farm to processing plant transport and in plant conveying operations, and means for removably suspending said assembly on a mating processing plant conveyor whereby on the same said structure assembly a plurality of said fowl may be secured and received at the farm and in transit and at the processing plant may be suspended from said conveyor for the usual processing; and
b. a coop frame having means enabling said coop frame to be releasably assembled with and to support said shackle structure and enabling the fowl bodies secured on said shackle structure to be directly supported in transit between the farm and processing plant and at said plant enabling said shackle structure to be disassembled therefrom.

6. A shackle structure as claimed in claim 5 wherein said coop frame includes a base frame having means enabling said base frame to releasably receive a plurality of said shackle structure assemblies each loaded with fowl, a securing frame mountable opposite said base frame for releasably receiving the same said plurality of said shackle structure assemblies, said securing frame being securable to said base frame to provide a coop-like structure for transport of said fowl between farm and plant.

7. A shackle structure as claimed in claim 6 wherein one of said base and securing frames includes a plurality of leg support bars for supporting the fowl in an upright position when in transit.

8. A shackle structure as claimed in claim 7 wherein said securing frame provides said leg support bars and said base and securing frames are formed for being loaded and assembled together in one position and then be inverted to an opposite position for transit.

9. A shackle structure as claimed in claim 8 wherein said means for holding said structure as an assembly comprises flexible band members capable of bending during conveyor travel.

10. In a fowl handling system, in combination:
a. a shackle structure having means for releasably securing selected limb portions of a plurality of live fowl while in transit and for suspending the same fowl while so secured on a conveyor mating such structure while said fowl is being processed; and
b. frame means having means for releasably holding the structure with the fowl upright and for directly supporting the fowl bodies while in transit.

* * * * *